US012739223B1

(12) United States Patent
Vladyka et al.

(10) Patent No.: US 12,739,223 B1
(45) Date of Patent: Sep. 15, 2026

(54) SERVICING BOTH VIRTUALIZED AND NON-VIRTUALIZED CUSTOMER PREMISES EQUIPMENT IN A UNIFIED PLATFORM

(71) Applicant: Harmonic, Inc., San Jose, CA (US)

(72) Inventors: Andrii Vladyka, Pleasanton, CA (US); Nimrod Ben-Natan, San Jose, CA (US); Jeremy C. Rosenberg, Huntingdon Valley, PA (US)

(73) Assignee: Harmonic, Inc., San Jose, CA (US)

( * ) Notice: Subject to any disclaimer, the term of this patent is extended or adjusted under 35 U.S.C. 154(b) by 227 days.

(21) Appl. No.: 18/231,153

(22) Filed: Aug. 7, 2023

Related U.S. Application Data

(60) Provisional application No. 63/396,160, filed on Aug. 8, 2022.

(51) Int. Cl.
*H04L 61/2582* (2022.01)
*H04L 45/00* (2022.01)
*H04L 45/76* (2022.01)

(52) U.S. Cl.
CPC ........ *H04L 61/2582* (2013.01); *H04L 45/566* (2013.01); *H04L 45/76* (2022.05)

(58) Field of Classification Search
CPC . H04L 12/4645; H04L 41/0897; H04L 45/76; H04L 41/0895
See application file for complete search history.

(56) References Cited

U.S. PATENT DOCUMENTS 8,938,769 B2 1/2015 Rakib
9,584,869 B2 2/2017 Rakib
9,641,354 B2 5/2017 Bernstein et al.
9,887,855 B2 2/2018 Rakib
10,089,123 B2 10/2018 Bernstein et al.
10,623,822 B2 4/2020 Shen et al.
10,802,856 B1 * 10/2020 Matatyaou .......... G06F 9/45558
11,621,777 B2 4/2023 Frozenfar
(Continued)

OTHER PUBLICATIONS

Minodier et al., "TR-317 Network Enhanced Residential Gateway", Jul. 2016, Broadband Forum, Issue 1, https://www.broadband-forum.org/pdfs/tr-317-1-0-0.pdf.*

*Primary Examiner* — Douglas B Blair
(74) *Attorney, Agent, or Firm* — Brokaw Patent Law, PC; Christopher J. Brokaw

(57) ABSTRACT

Integrating support for different types of customer premises equipment on an access network. A virtual Cable Modem Termination System (vCMTS) or virtual Broadband Network Gateway (BNG), embodied in software, operates on a network and receives a packet over an upstream channel from a physical unit of customer premises equipment (CPE). Upon the vCMTS/vBNG determining that the packet is not associated with a corresponding vCPE instance, which is a software representation of the physical unit that resides upstream from the vCMTS/vBNG, the vCMTS/vBNG processes the packet and sending a response downstream to the physical unit of CPE. However, upon the vCMTS/vBNG determining that the packet is associated with a corresponding vCPE instance, the vCMTS/vBNG forwards the packet for processing to the corresponding vCPE instance over a unicast UDP tunnel which originates at the vCMTS/vBNG. The location of the vCPE may be dynamically relocated between public and private networks.

24 Claims, 8 Drawing Sheets

(56) References Cited

U.S. PATENT DOCUMENTS

| | | | | |
|---|---|---|---|---|
| 11,675,663 | B1 * | 6/2023 | Levy | G06F 9/44505 714/15 |
| 11,991,246 | B2 * | 5/2024 | Shilimkar | H04L 67/1097 |
| 12,010,173 | B2 * | 6/2024 | Shilimkar | H04L 12/4645 |
| 12,079,341 | B2 * | 9/2024 | Sood | G06F 9/505 |
| 2015/0058470 | A1 * | 2/2015 | Duda | H04L 12/4633 709/224 |
| 2016/0328251 | A1 * | 11/2016 | Bernstein | G06F 9/45558 |
| 2017/0244577 | A1 * | 8/2017 | Patrick | H04L 12/2801 |
| 2018/0048716 | A1 * | 2/2018 | Madhayyan | G06F 9/45558 |
| 2020/0304458 | A1 * | 9/2020 | Fujii | H04L 12/4633 |
| 2020/0343988 | A1 * | 10/2020 | Nandiraju | H04J 3/0661 |
| 2021/0117360 | A1 * | 4/2021 | Kutch | G06F 13/4221 |
| 2021/0119820 | A1 * | 4/2021 | Matatyaou | H04L 12/2801 |
| 2022/0070024 | A1 * | 3/2022 | Dutta | H04L 12/4675 |
| 2022/0124029 | A1 * | 4/2022 | Finkelstein | H04L 12/4641 |
| 2022/0321566 | A1 * | 10/2022 | Coyle | H04L 63/101 |
| 2022/0405113 | A1 * | 12/2022 | Korud | H04L 41/0803 |
| 2024/0291889 | A1 * | 8/2024 | Shilimkar | H04L 69/22 |

* cited by examiner

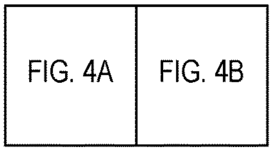

FIG. 4 vCPE Next Hop
vCPE
vCPE_MUX
US
Payload
DST IP
CPE IP
vCPE MAC
CPE MAC
802.1AD QinQ
vCPE MAC
vG_MUX MAC
Destination
Source
Payload
DST IP
vCPE/CPE IP
vCPE Next Hop MAC
vCPE MAC
Destination
Source
DS
Payload
SRC IP
CPE IP
vCPE MAC
CPE MAC
VxLAN
vCPE_MUX IP
vCMTS IP
vCPE_MUX MAC
vCMTS MAC
Source
Destination
Payload
SRC IP
CPE IP
vCPE MAC
CPE MAC
802.1AD QinQ
vG MAC
vCPE_MUX MAC
Source
Destination
Payload
SRC IP
vCPE/CPE IP
vCPE Next Hop MAC
vCPE MAC
Source
Destination
Private/public data center

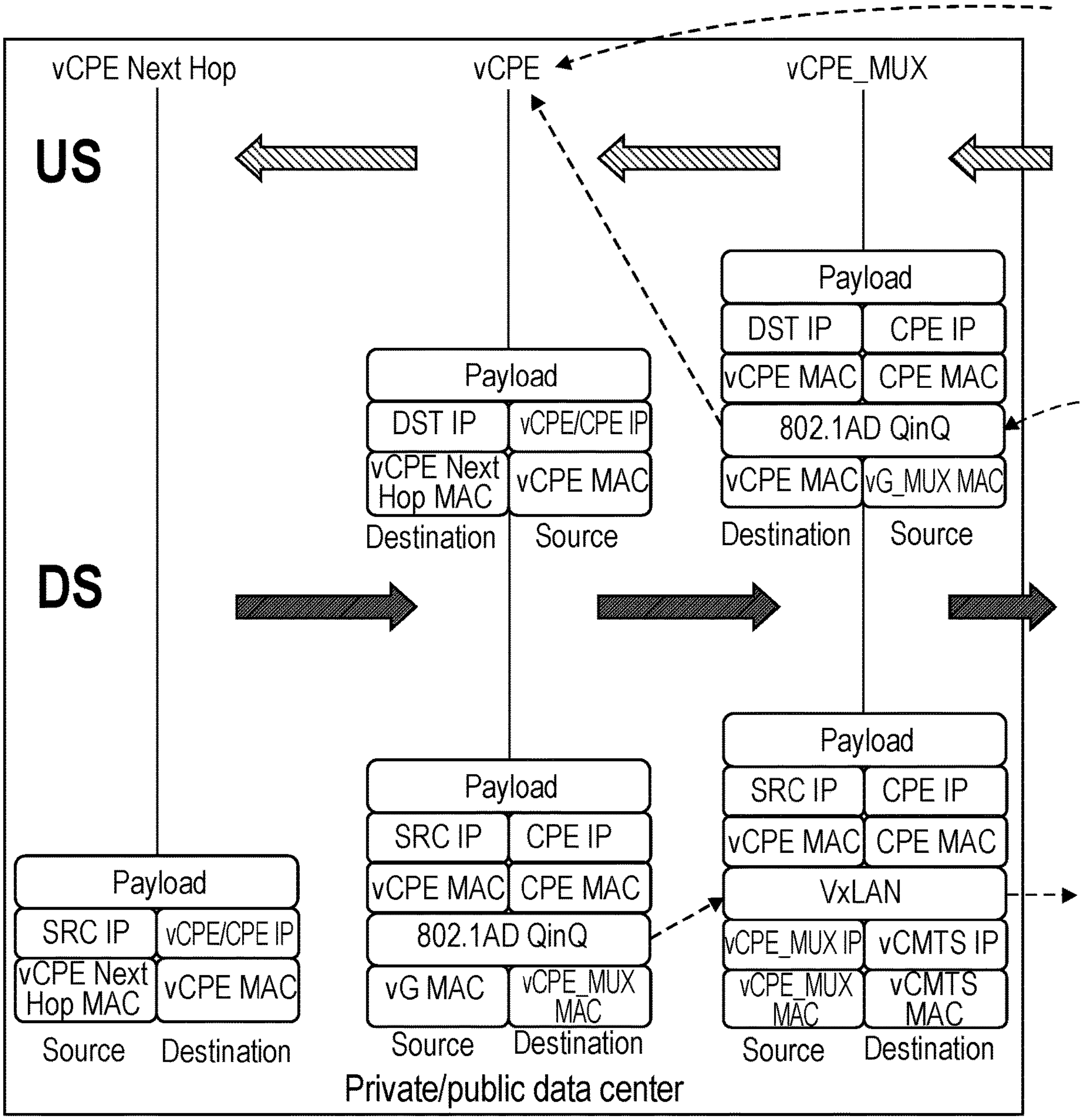

FIG. 4A

SERVICING BOTH VIRTUALIZED AND NON-VIRTUALIZED CUSTOMER PREMISES EQUIPMENT IN A UNIFIED PLATFORM

CLAIM OF PRIORITY

The present application claims priority to U.S. Provisional Patent Application No. 63/396,160, filed on Aug. 8, 2022, entitled 'Integration of the Existing Customer Premises Equipment Within a Network with Virtualized Customer Premises Equipment,' the entire contents of which are incorporated by reference for all purposes as if fully set forth herein.

FIELD OF THE INVENTION

Embodiments of the invention relate to integrating support for different types of customer premises equipment on an access network.

BACKGROUND

The term customer premises equipment (CPE) is a widely understood term of art that is used to refer to equipment that physically resides at a customer's premises and which is used to connect to a network, such as a cable modem, cable network, or a fiber access network. Examples of customer premises equipment include personal computers, routers, cellular phones having network access, and televisions having network access, to name but a few. To gain access to a network, customer premises equipment will often connect to a device, such as a cable modem, that may be provided by the operator of the network but physically located on the customer's premises.

Certain kinds of customer premises equipment connected to cable and fiber access networks has performed some functions traditionally associated with a router, such as Internet Protocol (IP) packet routing, firewall functions, and network access translation (NAT). As cable operators and internet service providers offer new network services, the functions performed by CPE may grow to include certain value-added features, such as parental control and enhanced security services. Adding support for a new service or feature to a particular unit of CPE is typically achieved by upgrading the firmware residing on that equipment.

As the number of valued-added features grows, the performance of CPE hardware may not be sufficient to accommodate the new functionality. This issue is often addressed by physically replacing the physical hardware of the CPE with a more performant one. Of course, this solution involves a certain amount of cost, frustration, and/or delay for the customer.

Over time, a new approach, referred to herein as disaggregated CPE, was developed to support the growing number of valued-added features available to CPE without requiring a complete hardware replacement for that CPE. The approach of disaggregated CPE involves a customer's CPE and a virtual counterpart of the customer's CPE, known as a virtual CPE (abbreviated vCPE). The customer's CPE naturally resides at the customer premises while the virtual CPE resides on the operator's network, typically at the network operator's datacenter. The disaggregated CPE approach provides for offloading compute-demanding functions that would otherwise be performed by the CPE located at the customer premises to the vCPE that resides at operator's datacenter. In this fashion, new services may be added to the vCPE residing at the operator's datacenter without upgrading or swapping the physical CPE residing at customer premises.

While the disaggregated CPE approach solves certain problems, there remains significant challenges to its use. In some cases, to use the disaggregated CPE approach, the CPE residing at the customer's premises requires certain hardware to support offloading functions to the vCPE. Thus, use the disaggregated CPE approach may still require swapping or upgrading the physical hardware of the CPE at the customer premises. Additionally, the offloading of functions from the physical CPE residing at the customer's premises to the vCPE is accomplished using tunneling. Special measures must be undertaken to support such tunneling, such as the use of IEEE 802.1AD tunneling (also known as Q-in-Q) or the use of Multiprotocol Label Switching (MPLS) tunneling, which imposes special requirements on the operator's network. Indeed, the requirements of MPLS tunneling renders it difficult or impossible for cloud services providers (CSP) infrastructure to use the disaggregated CPE approach.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 4 is a whole view of a single illustration formed by the partial views of FIG. 4A and FIG. 4B;

FIGS. 4A and 4B are a left half and a right half, respectively, of a two-page illustration of an exemplary approach for translating portions of packet payloads between physical and virtual CPE in accordance with an embodiment of the invention;

DETAILED DESCRIPTION

Embodiments are directed towards supporting new or augmented functionality and/or services in a variety of types of customer premises equipment in a unified manner. In the following description, for the purposes of providing a detailed explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Embodiments of the invention are directed towards providing new or augmented functionality and/or services on customer premises equipment (CPE) residing without changing or updating the physical hardware of that CPE as well as without changing or updating the existing operator's provisioning systems. Embodiments further allow use of the disaggregated CPE approach that permits flexible deployment in the infrastructure of the operator's data center and/or in the cable service provider. For example, the location of a deployed virtual CPE may be dynamically relocated between a private cloud and a public cloud.

Functional Overview

Approaches are presented for a virtualized cable modem termination system (vCMTS) and/or virtualized broadband network gateway (vBNG) that can be flexibly configured to serve both (a) CPEs having a corresponding virtual counterpart, i.e., a vCPE, and (b) CPEs lacking a corresponding vCPE. Both non-virtualized CPEs (i.e., those CPEs without a virtual counterpart, or vCPE) and disaggregated CPEs (i.e., those CPEs having a corresponding vCPE) can coexist on an operator's network connected to the same vCMTS/vBNG instance at the same time. Embodiments employ a software-based vCMTS/vBNG data plane that can process CPE packets from both non-virtualized CPEs and disaggregated CPEs. Further, the packets received at the vCMTS/vBNG data plane may be processed differently based on whether the packet originates from a non-virtualized CPE or a disaggregated CPE, as packets sent from non-virtualized CPEs are processed by vCMTS/vBNG internally, while those packets originating from a disaggregated CPE at a customer premises are forwarded to an external location, such as a private or public data center, for further processing by a virtualized CPE (vCPE) instance.

Figure 6:
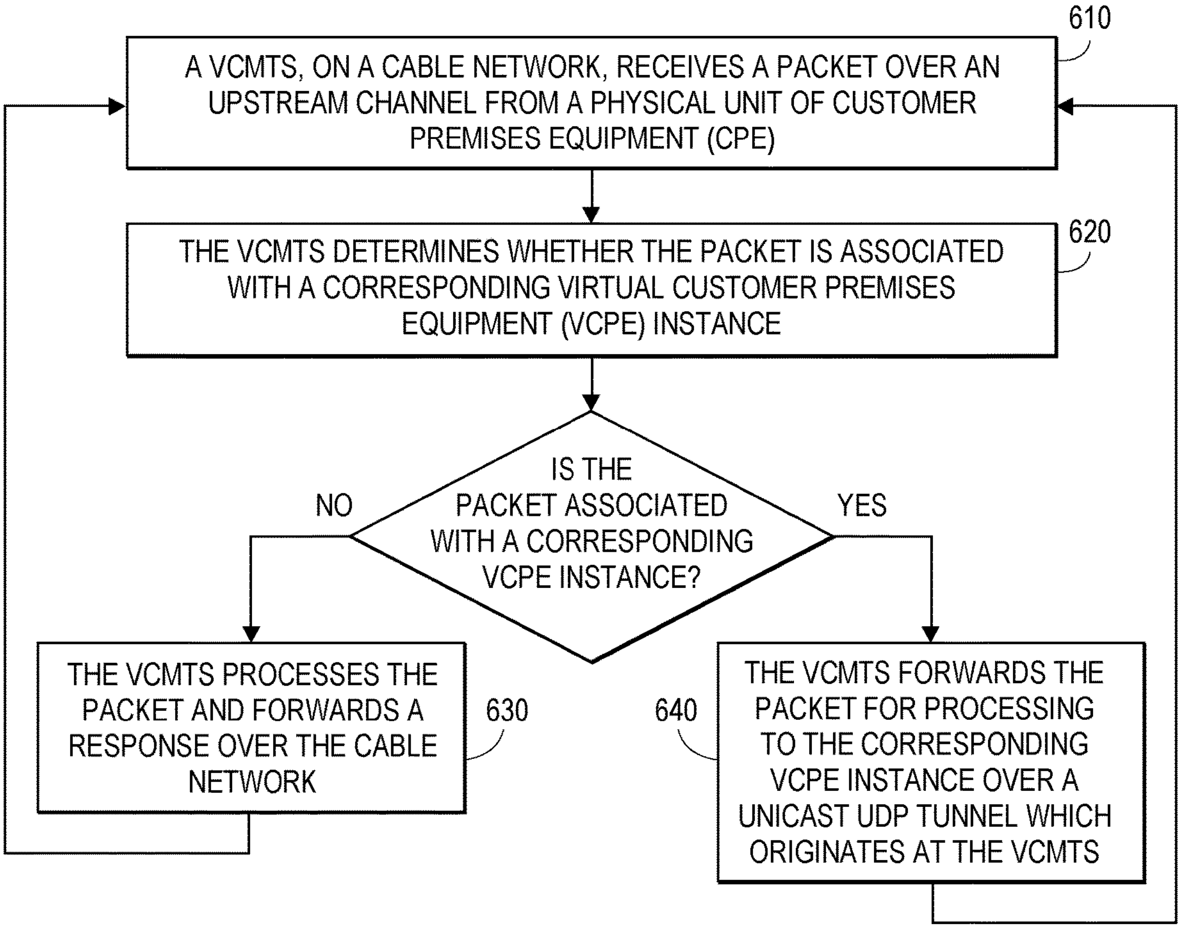
FIG. 6 flowchart that illustrates the functional steps performed by a virtual Cable Modem Termination System (vCMTS) in accordance with an embodiment of the invention.

The packets received at the vCMTS/vBNG data plane may be processed differently based on whether the packet originates from a non-virtualized CPE or a disaggregated CPE. FIG. 6 is a flowchart that illustrates the functional steps performed by a virtual Cable Modem Termination System (vCMTS) in accordance with an embodiment of the invention. As shown in FIG. 6, in step 610, a vCMTS, on a cable network, receives a packet over an upstream channel from a physical unit of customer premises equipment (CPE). Then, in step 620, the vCMTS determines whether the packet is associated with a corresponding virtual customer premises equipment (vCPE) instance, which is a software representation of the physical unit that resides upstream from the vCMTS. If the vCMTS determines that the packet is not associated with a corresponding vCPE instance, then in step 630, the vCMTS processes the packet and forwards a response over the cable network. On the other hand, if the vCMTS determines that the packet is associated with a corresponding vCPE instance, then in step 640 the vCMTS forwards the packet for processing to a corresponding vCPE instance over a unicast UDP tunnel which originates at the vCMTS.

Figure 7:
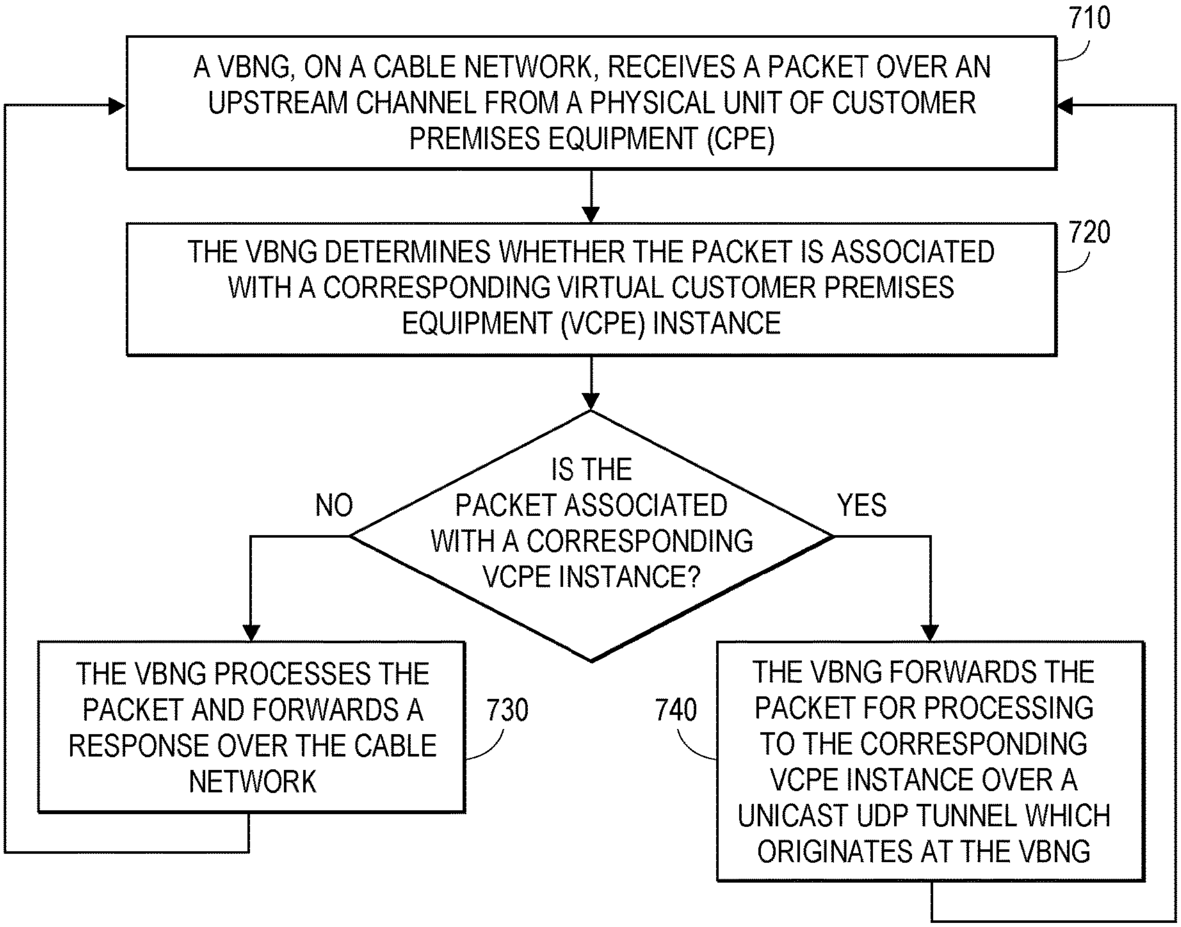
FIG. 7 flowchart that illustrates the functional steps performed by a virtual broadband network gateway (vBNG) in accordance with an embodiment of the invention.

FIG. 7 is a flowchart that illustrates the functional steps performed by a virtual broadband network gateway (vBNG) in accordance with an embodiment of the invention. As shown in FIG. 7, in step 710, vBNG, on a cable network, receives a packet over an upstream channel from a physical unit of customer premises equipment (CPE). Then, in step 720, the vBNG determines whether the packet is associated with a corresponding virtual customer premises equipment (vCPE) instance, which is a software representation of the physical unit that resides upstream from the vBNG. If vBNG determines that the packet is not associated with a corresponding vCPE instance, then in step 730, the vBNG processes the packet and forwards a response over the cable network. On the other hand, if the vBNG determines that the packet is associated with a corresponding vCPE instance, then in step 740 the vBNG forwards the packet for processing to a corresponding vCPE instance over a unicast UDP tunnel which originates at the vBNG.

Figure 1:
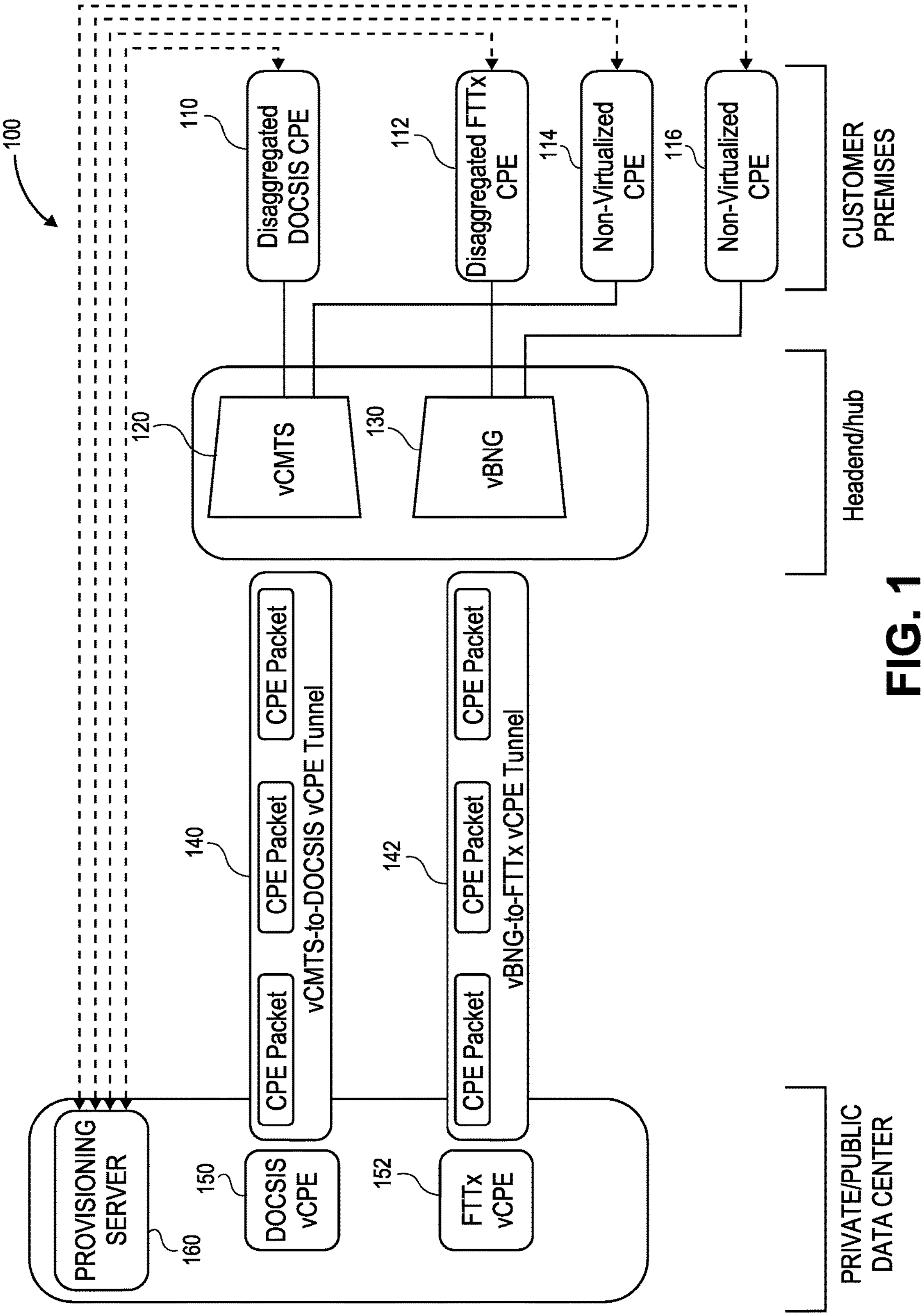
FIG. 1 is an illustration depicting a system in accordance with an embodiment of the invention.

FIG. 1 is an illustration depicting a system 100 in accordance with an embodiment of the invention. System 100 may be used by a cable operator to provide a variety of services to a variety of types of customer premises equipment (CPE). For purposes of providing a clear example, FIG. 1 depicts four units of CPE, namely CPEs 110, 112, 114, and 116. However, in practical implementations, naturally system 100 may include any number of CPEs.

As broadly used herein, the term "customer premises equipment (CPE)" refers to physical equipment that physically resides at a customer's premises and which is used to connect to a network. Non-limiting, illustrative examples of CPE include cable modems, personal computers, routers, cellular phones having network access, an Optical Network Unit (ONU) on a Passive Optical Network (PON), and televisions having network access. While a cable modem that resides at a customer premises may be provided by an operator of the network, as used herein, the cable modem is considered customer premises equipment (CPE). Accordingly, any type of CPE, including cable modems, may be used by embodiments of the invention.

FIG. 1 depicts several different types of CPE. DOCSIS CPE 110 refers to a physical unit of CPE that communicates to the network using the Data Over Cable Service Interface Specification (DOCSIS) standard. FTTX CPE 112 refers to a physical unit of CPE that communicates to the network using a Fibre to the X (FTTx) architecture. The DOCSIS protocol and an FTTx architecture are well-understood to those in the art. CPEs 114 and 116 are both physical units of CPE residing at a customer premises.

A distinguishing feature between the CPE shown in FIG. 1 is that CPEs 110 and 112 are disaggregated, while CPEs 114 and 116 are non-virtualized. As used herein, a disaggregated CPE is a physical unit of CPE residing at a customer premises which also have a virtual counterpart, called a virtual CPE, located elsewhere. For example, DOCSIS vCPE 150 corresponds to a software instance, acting as a virtual counterpart (i.e., a vCPE), of DOCSIS CPE 110. As another example, FTTx vCPE 152 corresponds to a software instance, acting as a virtual counterpart (i.e., a vCPE), of FTTx CPE 112. Thus, CPEs 110 and 112 are disaggregated as vCPEs 150 and 152 act as proxies or representatives of them respectively.

On the other hand, CPEs 114 and 116 are non-virtualized as each lacks a corresponding vCPE. As shown in FIG. 1, non-virtualized CPE 114 is in direct connection with vCMTS 120. For this reason, non-virtualized CPE 114 may be any device which may exchange communications over a network with vCMTS 120, such as without limitation a mobile phone, a cable modem, a television, an optical network unit (ONU), a tablet PC, and a computer. As shown in FIG. 1, non-virtualized CPE 116 is in direct connection with vBNG 130. For this reason, an illustrative example of non-virtualized CPE 116 may be any device which may exchange communications over a network with vBNG 120, such as without limitation a mobile phone, a cable modem, a television, an optical network unit (ONU), tablet PC, and a computer.

DOCSIS CPE 110 exchanges communications over the network with a virtual Cable Modem Termination System (vCMTS) 120 located at the headend or hub of the network operator. As used herein, virtual Cable Modem Termination System (vCMTS) 120 refers to a Cable Modem Termination System whose functions are expressed in software which is executed on general purpose hardware, e.g., commercial off-the-shelf (COTS) hardware. A commercial example of vCMTS 120 is CableOS available from Harmonic, Inc. FTTX CPE 112 exchanges communications over the network with a virtual Broadband Network Gateway (vBNG) 130 located at the headend or hub of the network operator. As used herein, virtual Broadband Network Gateway (vBNG) 130 refers to an access point for subscribers whose functions are expressed in software that is executed on general purpose hardware, e.g., commercial off-the-shelf (COTS) hardware.

As shown in FIG. 1, vCMTS 120 exchanges packets with a DOCSIS vCPE 150 over a vCMTS-to-DOCSIS vCPE tunnel 140. As shown in FIG. 1, DOCSIS vCPE 150 resides at a private data center or a public data center as opposed to the headend/hub of the network operator. Similarly, vBNG 130 exchanges packets with a FTTx vCPE 152 over a vBNG-to-FTTx vCPE tunnel 142. As shown in FIG. 1, FTTx vCPE 152 resides at a private data center or a public data center as opposed to the headend/hub of the network operator. Tunnels 140 and 142 may be unicast UDP-based VxLAN tunnels.

Provisioning server 160 resides at a private or public data center and is responsible for providing subscriber-specific information to other actors, such as vCMTS 120 and cable modems. For example, provisioning server 160 may provide customer-specific Quality of Service (QoS) information to a cable modem (CM) and to vCMTS 120 in a form of a binary-encoded configuration file transferred over TFTP protocol. The functions of provisioning server 160 may be implemented in hardware, software, or both.

When new functionality or services is desired to be added to DOCSIS CPE 110, software and configuration updates required to implement those new functions or services may be added to DOCSIS vCPE 150. When packets related to the new functions or services are sent from DOCSIS CPE 110 to vCMTS 120 over the network, vCMTS 120 forwards those packets over vCMTS-to-DOCSIS vCPE tunnel 140 to DOCSIS vCPE 150 residing at a private or public data center. Similarly, when packets related to the new functions or services are sent from FTTx CPE 112 to vBNG 130 over the network, vBNG 130 forwards those packets over vBNG-to-FTTx vCPE tunnel 142 to FTTx vCPE 152 residing at a private or public data center. Embodiments allows for a one-to-one mapping between a physical CPE residing at a customer's premises and the corresponding vCPE instance at operator's headend/hub data center or CSP infrastructure, while the mapping is preserved in CPE packets tunneled in transit between vCMTS/vBNG and vCPE instance.

Unlike how prior art approaches perform CPE disaggregation, embodiments of the invention do not require changing and/or upgrading the hardware of CPEs located at customer premises. This is so because rather than adding or upgrading the hardware of the CPE at the customer's premises, embodiments can implement the new or upgraded functionality in an vCPE instance maintained at a private or public data center. Embodiments may be used with existing cable customers legacy hardware DOCSIS 2.0/3.0/3.1 cable modems.

Advantageously, the operator of the network need not satisfy special requirements to support either tunnel 140 or 142, because, unlike VLAN-based and MPLS-based tunneling, unicast UDP traffic can be routed transparently in operator's network and over the public internet without a need to pre-provision intermediate routing and switching devices with any sort of tunnelling information. UDP traffic is also supported natively by the existing load-balancers utilized in bare-metal and Cloud Service Provider (CSP)-based virtualized compute infrastructure, which simplifies tunnel integration with the virtualized compute infrastructure hosting vCPE instances.

DOCSIS VCPE End-to-End Provisioning

Figure 2:
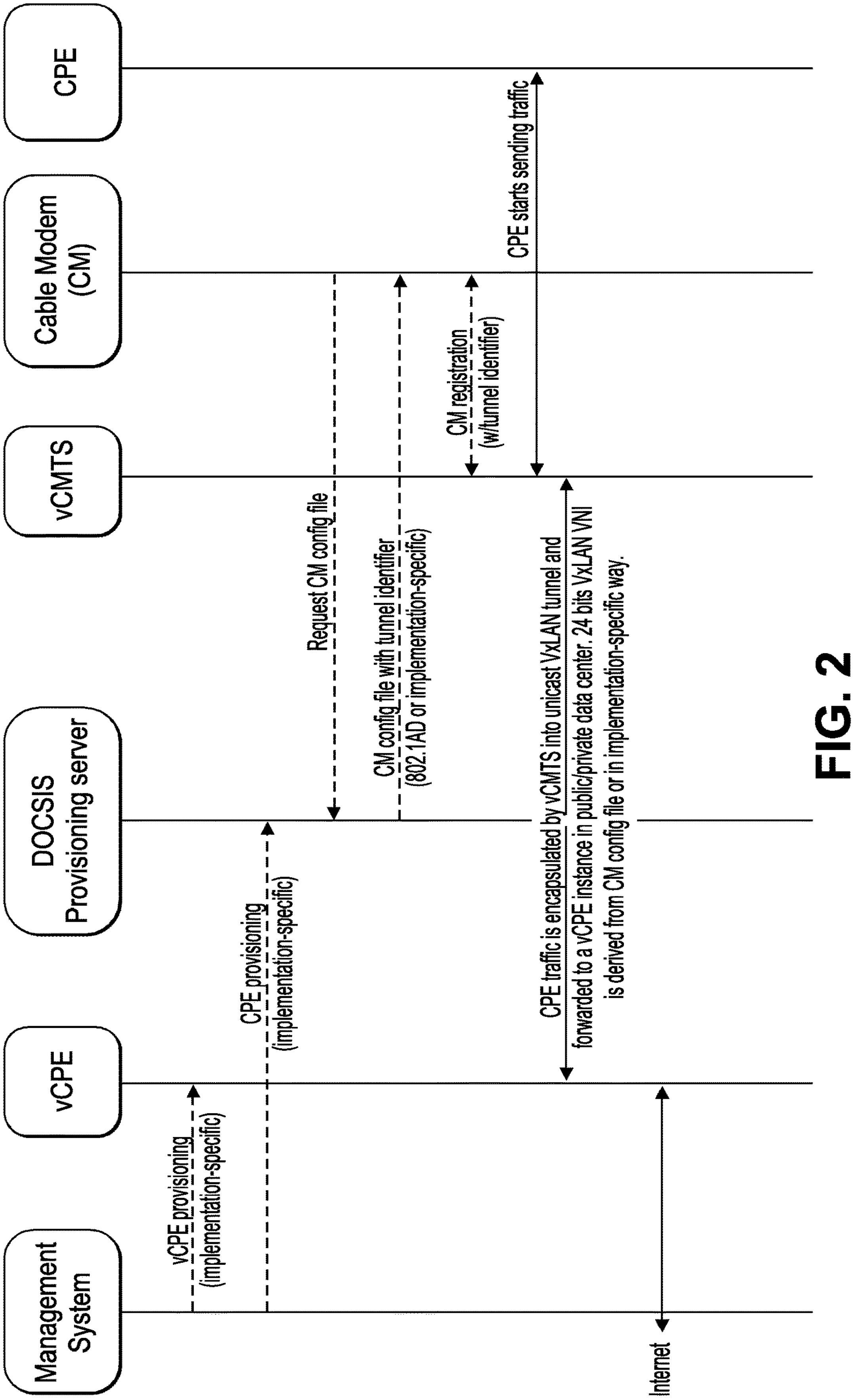
FIG. 2 is a sequence diagram that illustrates DOCSIS vCPE end-to-end provisioning in accordance with an embodiment of the invention.

FIG. 2 is a sequence diagram that illustrates DOCSIS vCPE end-to-end provisioning in accordance with an embodiment of the invention. The sequence diagram of FIG. 2 depicts a vCPE, a DOCSIS provisioning server, a vCMTS, a cable modem, and a unit of customer premises equipment (CPE).

For the purposes of providing a concrete example, the sequence depicted in FIG. 2 will be explained with reference to certain entities shown in FIG. 1; for example, the CPE of FIG. 2 may correspond to DOCSIS CPE 110, the vCMTS of FIG. 2 may correspond to vCMTS 120, the DOCSIS Provisioning Server of FIG. 2 may correspond to provisioning server 160, and vCPE of FIG. 2 may correspond to DOCSIS vCPE 150. FIG. 2 also depicts a cable modem (CM), which resides at a customer premises but is not depicted in FIG. 1. FIG. 2 also depicts a management system, which is an implementation specific software entity responsible for providing subscriber-specific information to other components in the network. An example of a management system is a network operator's Customer Relationship Management (CRM) database that stores subscriber-specific QoS data, such as service speed tiers, and provides subscriber information to vCMTS 120 and/or a provisional server.

As shown by FIG. 2, vCMTS 120 may discover the IP address of vCMTS-to-DOCSIS vCPE tunnel 140 for a particular vCPE instance, such as DOCSIS vCPE 150, in a variety of ways, such as using the cable modem configuration file or using static configuration applied to the CMTS via well-known operational support system (OSS) interfaces, such as command line interface (CLI) or the Network Configuration Protocol (NETCONF). The IP address information may be provided by provisioning server 160 in a cable modem binary configuration file or the like. Alternatively, an operator may directly provide this IP address information to the vCMTS 120.

Figure 4B:
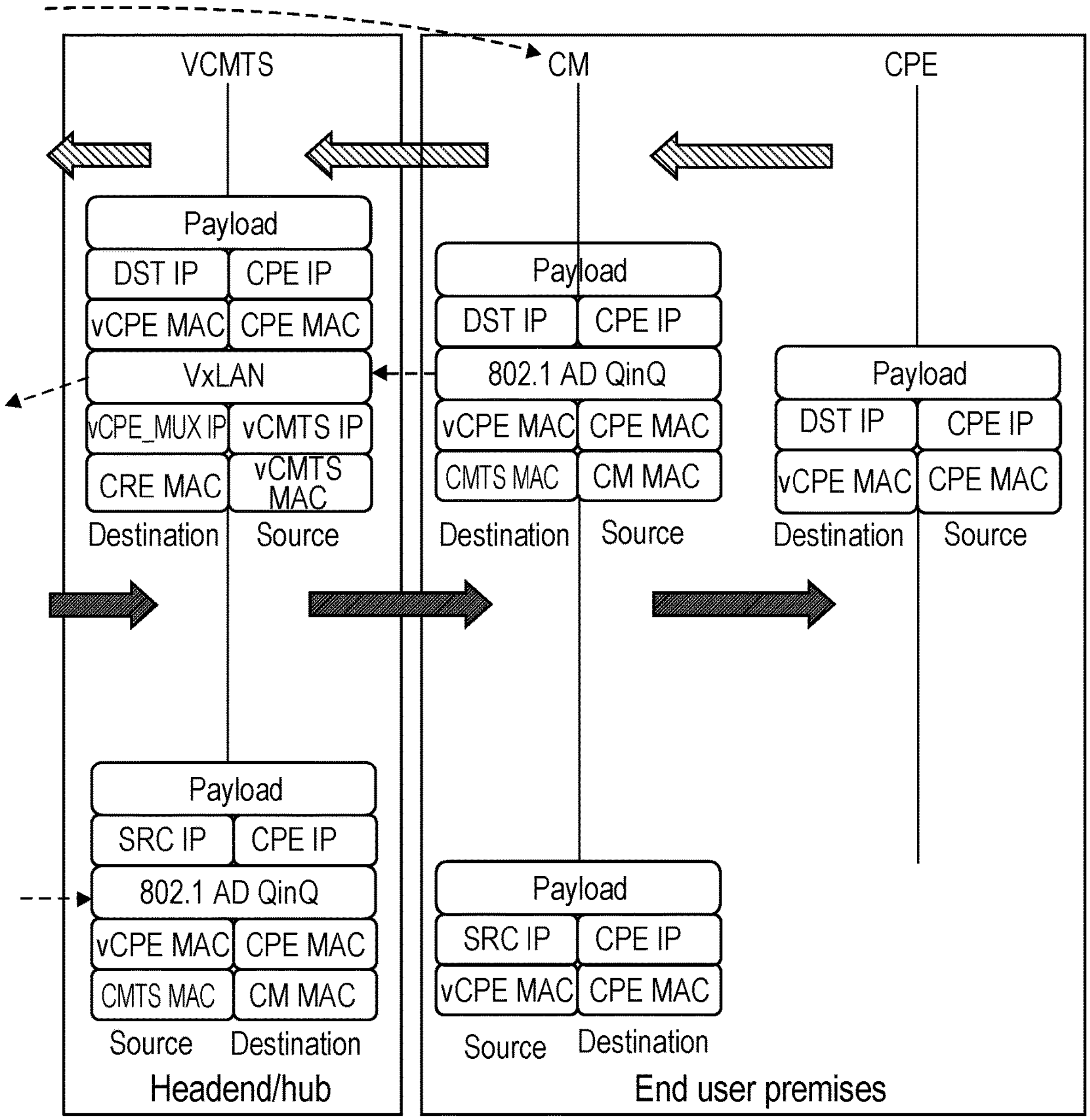

As is also shown in FIG. 1, vCMTS 120 forwards certain traffic over vCMTS-to-DOCSIS vCPE tunnel 140 to DOCSIS vCPE 150 for processing. When doing so, vCMTS 120 encapsulates the traffic to transmission over tunnel 140. FIGS. 4A and 4B, which are discussed below in greater detail, depict an illustrative example of the encapsulation that may be performed by an embodiment.

FTTX EPON VCPE End-to-End Provisioning

Figure 3:
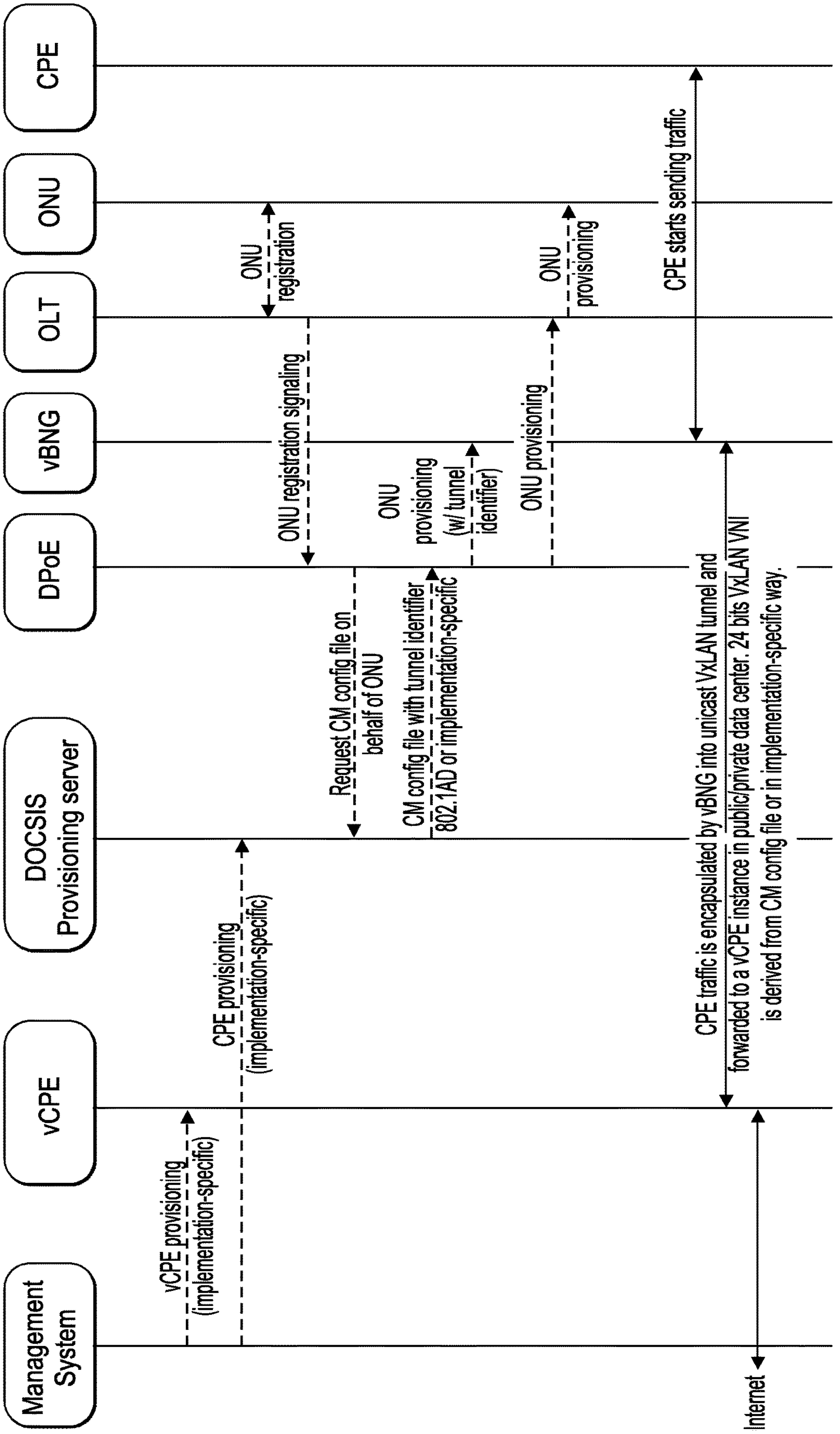
FIG. 3 is a sequence diagram that illustrates FTTx EPON vCPE end-to-end provisioning in accordance with an embodiment of the invention.

FIG. 3 is a sequence diagram that illustrates FTTX EPON vCPE end-to-end provisioning in accordance with an embodiment of the invention. For the purposes of providing a concrete example, the sequence depicted in FIG. 3 will be explained with reference to certain entities shown in FIG. 1; for example, the CPE of FIG. 3 may correspond to FTTx CPE 112, the vBNG of FIG. 3 may correspond to vBNG 130, the DOCSIS Provisioning Server of FIG. 3 may correspond to provisioning server 160, and vCPE of FIG. 3 may correspond to FTTx vCPE 152. FIG. 3 also depicts an Optical Line Terminal (OLT) and an Optical Network Unit (ONU), which are well-understood by those in the art but is not depicted in FIG. 1.

FIG. 3 depicts activity pertaining to a DOCSIS Provisioning of EPON (DpoE) entity. DPoE acts on behalf of an ONU and conceals the existence of the ONU and vBNG 130 from DOCSIS provisioning server 160. From the standpoint of provisioning server 160, the DPoE entity operates or presents itself in the same way as a DOCSIS cable modem. Once the DPoE entity receives DOCSIS provisioning information in a form of a binary cable modem configuration file from provisioning server 160, the DPoE entity applies the DOCSIS provisioning information to vBNG 130 and the ONU.

Packet Translation

FIGS. 4A and 4B are a two-part illustration of an exemplary approach for translating portions of packet payloads between the CPE physically residing at the customer premise (such as CPEs 110, 112) and virtual CPEs (such as 150 and 152) in accordance with an embodiment of the invention. FIGS. 4A and 4B depict a single illustration spread over two sheets, as shown in FIG. 4, which is a whole view of a single illustration formed by the partial views of FIG. 4A and FIG. 4B. In the example of FIGS. 4A and 4B, a DOCSIS cable modem is provisioned with 802.1AD Q-in-Q tags (12 bits inner tag and 12 bits outer tag), which are seamlessly translated by vCMTS 120 into 24 bits of VxLAN VNI between vCMTS 120 and vCPE_MUX, which performs reverse 1:1 translation of VxLAN VNI into 802.1AD tags and forwards CPE traffic to the corresponding vCPE instance. The presence of vCPE_MUX is optional and vCPE implementation specific and provided here to illustrate one possible implementation example per Broadband Forum TR-317.

Provisioning server 160 may provide tunneling information to a cable modem (CM) and/or vCMTS 120 in a variety of ways, including vendor-specific type-length value (TLV) encoding schemes. Provisioning server 160 may also provide tunneling information to a CM and/or vCMTS 160 in an industry-standard way, such as provisioning a CM with 802.1AD Q-in-Q VLAN tags. The specific example shown in FIG. 4A, 4B depicts an industry-standard way of providing tunneling information. In this example, a combination of inner and outer tags provides a 12+12=24 bit identifier which can support a range of values large enough to uniquely identify all CMs connected to the same vCMTS instance (tens of thousands units, typically). The combination of inner and outer tags may also be translated 1:1 to a VxLAN VNI, which also consists of 24 bits. Other translation mechanisms may be used by embodiments.

Using standard UDP-based unicast VxLAN tunnelling between vCMTS/vBNG and vCPE instances enables flexible network-agnostic vCPE deployment in private/public data center infrastructure. Moreover, the vCPE instance may be dynamically moved between private and public cloud infrastructure without the need to re-provision physical CPE residing at the customer's premises. Additional details about how vCPE instances may be moved will be presented below.

Dynamic Relocation of a Virtual CPE Instance

Figure 5:
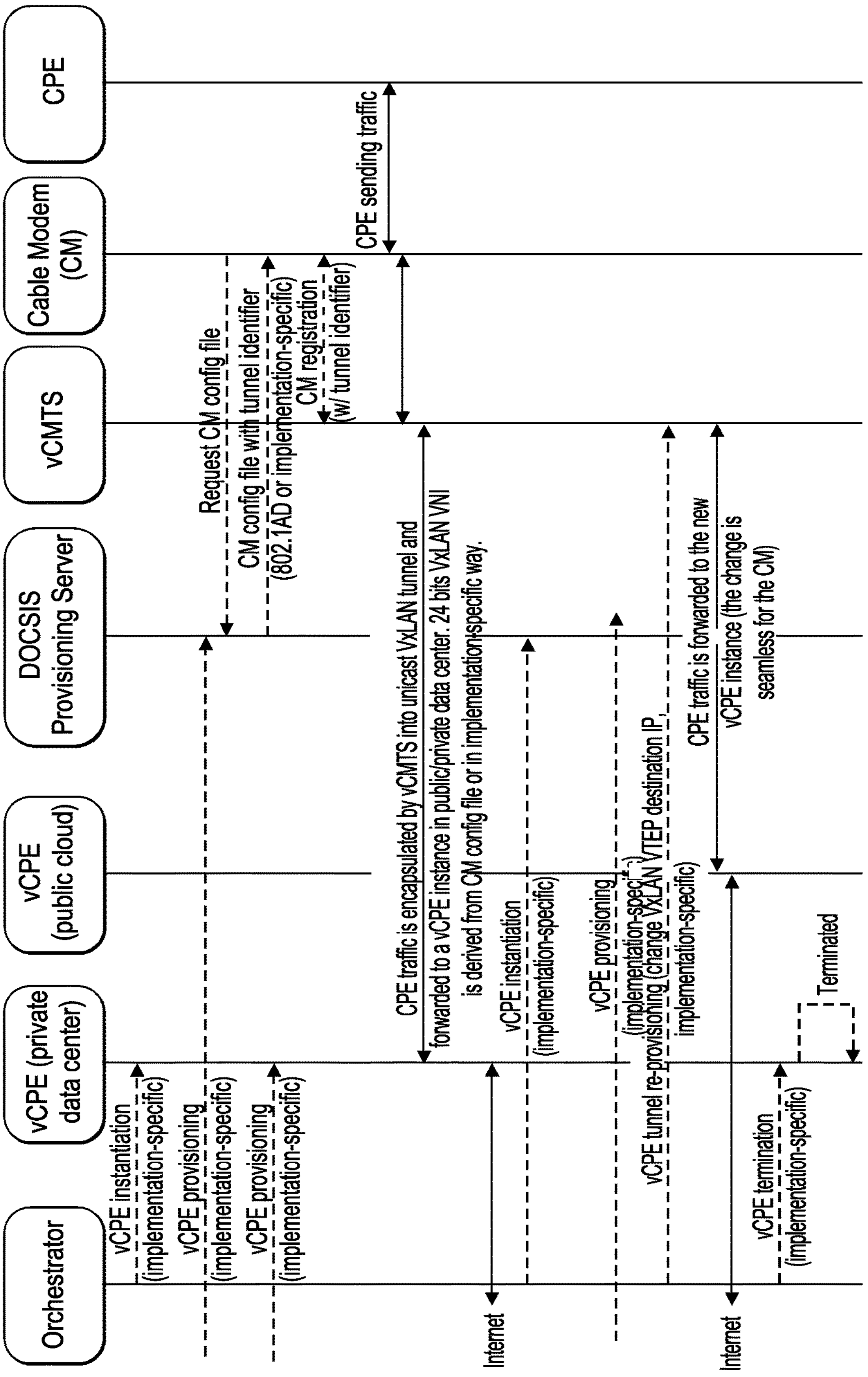
FIG. 5 is a sequence diagram that illustrates dynamically moving a vCPE instance between a private network and a public network in accordance with an embodiment of the invention.

FIG. 5 is a sequence diagram that illustrates dynamically moving a vCPE instance from a private network to a public network in accordance with an embodiment of the invention. As reflected by FIG. 5, an example flow of orchestrator moving a vCPE instance from a private cloud to public cloud is as follows (a) a vCPE instance is created by the orchestrator in a private data center, (b) the vCMTS is provisioned with vCPE instance details, such destination IPv4/IPv6 address and VxLAN VNI, (c) the orchestrator monitors vCPE health status and listens for an external events, such as operator's API calls, (d) the orchestrator detects an event or an API call that triggers vCPE re-instantiation; possible triggers include but not limited to vCPE instance failure and vCPE telemetry that signals certain resources consumption patterns (e.g., low/high traffic rate), (e) external API call signals orchestrator to move workload to a new location due to cost considerations (e.g., availability of "cheap" compute resources in a certain public cloud zone), (f) the orchestrator instantiates a new vCPE instance, according to the new compute selection criteria, (g) the orchestrator signals to the vCMTS in an implementation-specific way the new vCPE "location," (h) the vCMTS dynamically changes destination IPv4/IPv6 address (and, potentially, VxLAN VNI) for the corresponding vCPE traffic; this change is performed seamlessly from the vCPE standpoint, and (i) the orchestrator deletes the old vCPE instance.

The dynamic vCPE relocation from a private network to a public network shown in FIG. 5 would either not be possible or be associated with significant difficulties in case of prior art VLAN-based or MPLS-based CM provisioning, as it would require "stretching" VLAN of MPLS pseudowire between operator's network and CSP infrastructure. Embodiments employ unicast UDP-based tunnelling which enables simpler network configuration and robust traversal of private and public networks overcoming many obstacles of the prior art.

EXTENSIONS

The term "non-transitory computer-readable storage medium" as used herein refers to any tangible, physical medium that participates in persistently storing instructions or operational guidance which may be provided to a processor for execution. Additional details about the operation of non-transitory computer-readable storage mediums may be found within U.S. Pat. No. 11,212,590, issued Dec. 28, 2021, entitled "Multiple Core Software Forwarding," the entire contents of which are hereby incorporated by reference for all purposes as if fully set forth herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for a virtual Cable Modem Termination System (vCMTS), which when executed, cause:

the vCMTS, on a cable network, receiving a packet over an upstream channel from a physical unit of customer premises equipment (CPE);

the vCMTS determining whether the packet is associated with a corresponding virtual customer premises equipment (vCPE) instance, wherein said vCPE instance is a software representation of said physical unit that resides upstream from said vCMTS;

upon the vCMTS determining that the packet is not associated with a corresponding vCPE instance, the vCMTS processing the packet and forwarding a response over the cable network; and upon the vCMTS determining that the packet is associated with a corresponding vCPE instance, the vCMTS forwarding the packet for processing to said corresponding vCPE instance over a unicast UDP tunnel which originates at said vCMTS.

2. The non-transitory computer-readable storage medium of claim 1, wherein said vCMTS forwards the packet for processing to said corresponding vCPE instance over a unicast UDP tunnel which originates at said vCMTS comprises:

the vCMTS performing a 1:1 translation of a cable modem identifier from an 802.1AD Q-in-Q tag into a VxLAN Visual Network Index (VNI) or from a VxLAN Visual Network Index (VNI) to an 802.1AD Q-in-Q tag.

3. The non-transitory computer-readable storage medium of claim 1, wherein execution of the one or more sequences of instructions further cause:

moving said corresponding vCPE instance from being located to private network to a public network.

4. The non-transitory computer-readable storage medium of claim 1, wherein execution of the one or more sequences of instructions further cause:

moving said corresponding vCPE instance from being located to public network to a private network.

5. A non-transitory computer-readable storage medium storing one or more sequences of instructions for a virtual Broadband Network Gateway (vBNG), which when executed, cause:

the vBNG, on a cable network, receiving a packet over an upstream channel from a physical unit of customer premises equipment (CPE);

the vBNG determining whether the packet is associated with a corresponding virtual customer premises equipment (vCPE) instance, wherein said vCPE instance is a software representation of said physical unit that resides upstream from said vBNG;

upon the vBNG determining that the packet is not associated with a corresponding vCPE instance, the vBNG processing the packet and forwarding a response over the cable network; and upon the vBNG determining that the packet is associated with a corresponding vCPE instance, the vBNG forwarding the packet for processing to said corresponding vCPE instance over a unicast UDP tunnel which originates at said vBNG.

6. The non-transitory computer-readable storage medium of claim 5, wherein said vBNG forwarding the packet for processing to said corresponding vCPE instance over a unicast UDP tunnel which originates at said vBNG comprises:

the vBNG performing a 1:1 translation of a cable modem identifier from an 802.1AD Q-in-Q tag into a VxLAN Visual Network Index (VNI) or from a VxLAN Visual Network Index (VNI) to an 802.1AD Q-in-Q tag.

7. The non-transitory computer-readable storage medium of claim 5, wherein execution of the one or more sequences of instructions further cause:

moving said corresponding vCPE instance from being located to private network to a public network.

8. The non-transitory computer-readable storage medium of claim 5, wherein execution of the one or more sequences of instructions further cause:

moving said corresponding vCPE instance from being located to public network to a private network.

9. An apparatus for a virtual Cable Modem Termination System (vCMTS), comprising:

one or more processors; and one or more non-transitory computer-readable storage mediums storing one or more sequences of instruction, which when executed, cause:

the vCMTS, on a cable network, receiving a packet over an upstream channel from a physical unit of customer premises equipment (CPE);

the vCMTS determining whether the packet is associated with a corresponding virtual customer premises equipment (vCPE) instance, wherein said vCPE instance is a software representation of said physical unit that resides upstream from said vCMTS;

upon the vCMTS determining that the packet is not associated with a corresponding vCPE instance, the vCMTS processing the packet and forwarding a response over the cable network; and upon the vCMTS determining that the packet is associated with a corresponding vCPE instance, the vCMTS forwarding the packet for processing to said corresponding vCPE instance over a unicast UDP tunnel which originates at said vCMTS.

10. The apparatus of claim 9, wherein said vCMTS forwards the packet for processing to said corresponding vCPE instance over a unicast UDP tunnel which originates at said vCMTS comprises:

the vCMTS performing a 1:1 translation of a cable modem identifier from an 802.1AD Q-in-Q tag into a VxLAN Visual Network Index (VNI) or from a VxLAN Visual Network Index (VNI) to an 802.1AD Q-in-Q tag.

11. The apparatus of claim 9, wherein execution of the one or more sequences of instructions further cause:

moving said corresponding vCPE instance from being located to private network to a public network.

12. The apparatus of claim 9, wherein execution of the one or more sequences of instructions further cause:

moving said corresponding vCPE instance from being located to public network to a private network.

13. An apparatus for a virtual Broadband Network Gateway (vBNG), comprising:

one or more processors; and one or more non-transitory computer-readable storage mediums storing one or more sequences of instruction, which when executed, cause:

the vBNG, on a cable network, receiving a packet over an upstream channel from a physical unit of customer premises equipment (CPE);

the vBNG determining whether the packet is associated with a corresponding virtual customer premises equipment (vCPE) instance, wherein said vCPE instance is a software representation of said physical unit that resides upstream from said vBNG;

upon the vBNG determining that the packet is not associated with a corresponding vCPE instance, the vBNG processing the packet and forwarding a response over the cable network; and upon the vBNG determining that the packet is associated with a corresponding vCPE instance, the vBNG forwarding the packet for processing to said corresponding vCPE instance over a unicast UDP tunnel which originates at said vBNG.

14. The apparatus of claim 13, wherein said vBNG forwarding the packet for processing to said corresponding vCPE instance over a unicast UDP tunnel which originates at said vBNG comprises:

the vBNG performing a 1:1 translation of a cable modem identifier from an 802.1AD Q-in-Q tag into a VxLAN Visual Network Index (VNI) or from a VxLAN Visual Network Index (VNI) to an 802.1AD Q-in-Q tag.

15. The apparatus of claim 13, wherein execution of the one or more sequences of instructions further cause:

moving said corresponding vCPE instance from being located to private network to a public network.

16. The apparatus of claim 13, wherein execution of the one or more sequences of instructions further cause:

moving said corresponding vCPE instance from being located to public network to a private network.

17. A method for a virtual Cable Modem Termination System (vCMTS), comprising:

the vCMTS, on a cable network, receiving a packet over an upstream channel from a physical unit of customer premises equipment (CPE);

the vCMTS determining whether the packet is associated with a corresponding virtual customer premises equipment (vCPE) instance, wherein said vCPE instance is a software representation of said physical unit that resides upstream from said vCMTS;

upon the vCMTS determining that the packet is not associated with a corresponding vCPE instance, the vCMTS processing the packet and forwarding a response over the cable network; and upon the vCMTS determining that the packet is associated with a corresponding vCPE instance, the vCMTS forwarding the packet for processing to said corresponding vCPE instance over a unicast UDP tunnel which originates at said vCMTS.

18. The method of claim 17, wherein said vCMTS forwards the packet for processing to said corresponding vCPE instance over a unicast UDP tunnel which originates at said vCMTS comprises:

the vCMTS performing a 1:1 translation of a cable modem identifier from an 802.1AD Q-in-Q tag into a VxLAN Visual Network Index (VNI) or from a VxLAN Visual Network Index (VNI) to an 802.1AD Q-in-Q tag.

19. The method of claim 17, further comprising:

moving said corresponding vCPE instance from being located to private network to a public network.

20. The method of claim 17, further comprising:

moving said corresponding vCPE instance from being located to public network to a private network.

21. A method for a virtual Broadband Network Gateway (vBNG), further comprising:

the vBNG, on a cable network, receiving a packet over an upstream channel from a physical unit of customer premises equipment (CPE);

the vBNG determining whether the packet is associated with a corresponding virtual customer premises equipment (vCPE) instance, wherein said vCPE instance is a software representation of said physical unit that resides upstream from said vBNG;

upon the vBNG determining that the packet is not associated with a corresponding vCPE instance, the vBNG processing the packet and forwarding a response over the cable network; and upon the vBNG determining that the packet is associated with a corresponding vCPE instance, the vBNG forwarding the packet for processing to said corresponding vCPE instance over a unicast UDP tunnel which originates at said vBNG.

22. The method of claim 21, wherein said vBNG forwarding the packet for processing to said corresponding vCPE instance over a unicast UDP tunnel which originates at said vBNG comprises:

the vBNG performing a 1:1 translation of a cable modem identifier from an 802.1AD Q-in-Q tag into a VxLAN Visual Network Index (VNI) or from a VxLAN Visual Network Index (VNI) to an 802.1AD Q-in-Q tag.

23. The method of claim 21, further comprising:

moving said corresponding vCPE instance from being located to private network to a public network.

24. The method of claim 21, further comprising:

moving said corresponding vCPE instance from being located to public network to a private network.

* * * * *